United States Patent [19]

Smith et al.

[11] Patent Number: 5,958,366
[45] Date of Patent: Sep. 28, 1999

[54] SYNTHESIS OF LARGE CRYSTAL ZEOLITES

[75] Inventors: Robert Scott Smith, Houston, Tex.; Johannes Petrus Verduijn, deceased, late of Leefdaal, Belgium; Jannetje Maatje van den Berge, executrix, Oostvoorne, Netherlands; Thomas H. Colle, Houston; Gary David Mohr, League City, both of Tex.; Gotz Burgfels, Bad Aibling; Josef Schonlinner, Obing, both of Germany

[73] Assignee: Exxon Chemical Patents Inc., Houston, Tex.

[21] Appl. No.: 08/954,341

[22] Filed: Oct. 17, 1997

Related U.S. Application Data

[60] Provisional application No. 60/028,830, Oct. 17, 1996.

[51] Int. Cl.$^6$ .................................................. C01B 39/36
[52] U.S. Cl. ........................ 423/700; 423/702; 423/709; 423/711; 423/716; 423/DIG. 22; 423/DIG. 29
[58] Field of Search ..................... 423/700, 702, 423/709, 711, 716, DIG. 22, DIG. 29, 328.2

[56] References Cited

U.S. PATENT DOCUMENTS

| | | | |
|---|---|---|---|
| 3,920,798 | 11/1975 | Weber | 423/711 |
| 4,406,822 | 9/1983 | Sanders et al. | 423/709 |
| 4,650,656 | 3/1987 | Dwyer et al. | |
| 4,687,654 | 8/1987 | Taramasso et al. | 423/DIG. 22 |
| 5,525,323 | 6/1996 | Mueller et al. | 423/705 |
| 5,714,133 | 2/1998 | Schmitt | 423/328.2 |

FOREIGN PATENT DOCUMENTS

| | | |
|---|---|---|
| 0026963 | 4/1981 | European Pat. Off. . |
| 0156594 | 10/1985 | European Pat. Off. . |
| 777 233 | 6/1957 | United Kingdom . |
| 831 076 | 3/1960 | United Kingdom . |
| WO9308124 | 4/1993 | WIPO . |

OTHER PUBLICATIONS

Patent Abstracts of Japan, vol. 008, No. 114 (C–225), May 26, 1984 and JP 59026917A (KAO Sekken KK), Feb. 13, 1984.

*Primary Examiner*—Mark L. Bell
*Assistant Examiner*—David Sample
*Attorney, Agent, or Firm*—Edward F. Sherer

[57] ABSTRACT

Large crystal zeolites are prepared by heating a zeolite synthesis mixture under agitation to a temperature equal to or less than the effective nucleation temperature of the zeolite synthesis mixture and thereafter the zeolite synthesis mixture is heated without agitation to a temperature equal to or greater than the effective nucleation temperature of the zeolite synthesis mixture.

26 Claims, No Drawings

SYNTHESIS OF LARGE CRYSTAL ZEOLITES

This application claims priority to U.S. Provisional Patent Application No. 60/028,830, filed Oct. 17, 1996.

FIELD OF THE INVENTION

This invention relates to a method of preparing crystalline zeolites wherein the crystalline zeolites are crystallized in the form of large crystals.

BACKGROUND OF THE INVENTION

Crystalline microporous molecular sieves, both natural and synthetic, such as zeolites, have been demonstrated to have catalytic properties for various types of hydrocarbon conversion processes. In addition, the crystalline microporous molecular sieves have been used as adsorbents and catalyst carriers for various types of hydrocarbon conversion processes, and other applications. These molecular sieves are ordered, porous, crystalline material having a definite crystalline structure as determined by x-ray diffraction, within which there are a large number of smaller cavities which may be interconnected by a number of still smaller channels or pores. The dimensions of these channels or pores are such as to allow adsorption of molecules with certain dimensions while rejecting those with larger dimensions. The interstitial spaces or channels formed by the crystalline network enable molecular sieves, such as crystalline aluminosilicates, to be used as molecular sieves in separation processes and catalysts and catalyst supports in a wide variety of hydrocarbon conversion processes.

Zeolites are comprised of a lattice of silica and optionally alumina combined with exchangeable cations such as alkali or alkaline earth metal ions. Although the term "zeolites" includes materials containing silica and optionally alumina, it is recognized that the silica and alumina portions may be replaced in whole or in part with other oxides. For example, germanium oxide, tin oxide, phosphorous oxide, and mixtures thereof can replace the silica portion. Boron oxide, iron oxide, titanium oxide, gallium oxide, indium oxide, and mixtures thereof can replace the alumina portion. Accordingly, the terms "zeolite", "zeolites" and "zeolite material", as used herein, shall mean not only molecular sieves containing silicon and, optionally, aluminum atoms in the crystalline lattice structure thereof, but also molecular sieves which contain suitable replacement atoms for such silicon and aluminum, such as silicoaluminophosphates (SAPO) and aluminophosphates (ALPO). The term "aluminosilicate zeolite", as used herein, shall mean zeolites consisting essentially of silicon and aluminum atoms in the crystalline lattice structure thereof.

The catalytic activity of many zeolites relies on their acidity. The substitution of silica with elements such as alumina with a lower valence state creates a positive charge deficiency, which can be compensated by a cation such as a hydrogen ion. The acidity of the zeolite can be on the surface of the zeolite and also within the channels of the zeolite. Within a pore of the zeolite, hydrocarbon conversion reactions such as paraffin isomerization, olefin skeletal or double bond isomerization, disproportionation, alkylation, and transalkylation of aromatics may be governed by constraints imposed by the channel size of the molecular sieve. Reactant selectivity occurs when a fraction of the feedstock is too large to enter the pores to react, while product selectivity occurs when some of the products cannot leave the channels. Product distributions can also be altered by transition state selectivity in which certain reactions can not occur because the reaction transition state is too large to form within the pores of the zeolite. Selectivity can also result from configuration constraints on diffusion where the dimensions of the molecule approach that of the pore system. Non-selective reactions on the surface of the molecular sieve, such as reactions on the surface acid sites of the zeolite, are usually not desirable as such reactions are not subject to the shape selective constraints imposed on those reactions occurring within the channels of the molecular sieve. Thus, resulting products produced by reaction with the surface acid sites of the zeolite are many times undesirable and can also deactivate the catalyst.

Large crystal zeolites are many times desirable in hydrocarbon conversion processes. The term "large crystal" is used herein to mean the crystals have a mass mean diameter of at least about 2 microns. For example, large crystal zeolites have less specific outer crystal surface area which can reduce the amount of reactions which take place on the outer surface of the zeolite. Furthermore, large crystal zeolites have longer diffusion path lengths which can be used to modify catalytic reactions. For instance, with respect to intermediate pore size zeolites such as a MFI structure type, increasing the crystal size can change the selectivity of the catalyst when it is used in hydrocarbon conversion processes such as the disproportionation of toluene to paraxylene and the alkylation of aromatics. In the disproportionation of toluene to paraxylene, increasing the size of the zeolite crystal to lengthen the diffusion path can increase selectivity for the desired product. With respect to disproportionation of toluene to paraxylene, the selectivity occurs because an increase in the diffusion constraints is imposed on the bulkier, slower diffusing ortho- and meta-xylene isomers which reduces the production of these isomers and increases the yield of the paraxylene isomer.

Zeolite crystallization is commonly conducted in large autoclaves and frequently requires many hours for completion. In order to increase the rate of formation of the zeolite crystals, the zeolite synthesis mixture is agitated to increase mass transfer and thereby decrease the amount of time to complete crystallization of the zeolite crystals. Although agitation the zeolite synthesis mixture reduces the amount of time to complete the zeolite crystallization, zeolite synthesis processes in which agitation is used throughout the entire synthesis time can produce unacceptable amounts of small crystal zeolites. Thus, the combined objective of manufacturing large crystal zeolite without having to conduct the manufacture over unacceptably long periods of time is somewhat irreconcilable in many of the prior art processes.

The present invention provides a process of preparing large crystal zeolites which overcomes or at least mitigates the above described problems.

SUMMARY OF THE INVENTION

In accordance with the present invention, there is provided a process for preparing large crystal zeolites. The process comprises the step of heating an aqueous zeolite synthesis mixture under agitation to a temperature equal to or less than the effective nucleation temperature of the synthesis mixture. After this step, the aqueous synthesis mixture is heated in the absence of agitation to a temperature equal to or greater than the effective nucleation temperature of the aqueous zeolite synthesis mixture. As used in the specification and claims, the term "effective nucleation temperature" means the temperature at which continued stirring of the heated zeolite synthesis mixture would result in significant decrease of the mass mean crystal diameter of the product zeolite crystals, e.g., a reduction of the mass mean crystal diameter of the product crystals of 15 percent or greater. Preferably, the selected temperature to which the synthesis mixture is heated with stirring will result in a reduction of the mass mean crystal diameter of the product crystals of less than 10 percent, more preferably less than 5 percent.

DETAILED DESCRIPTION OF THE INVENTION

The process of the present invention for preparing large crystal zeolite preferably comprises the following steps:

(a) forming an aqueous reaction mixture containing sources of a trivalent metal oxide such as alumina or gallia, silica, alkali metal cations, optionally from 0 to about 10 weight percent seed crystals based on the weight of the reaction mixture and, optionally a directing agent;

(b) heating the aqueous reaction mixture under agitation and for sufficient time to a temperature no greater than the effective nucleation temperature of the aqueous reaction mixture to effect heat transfer to the aqueous reaction mixture to achieve a more uniform temperature in the aqueous reaction mixture; and (c) heating the aqueous reaction mixture of step (b) in the absence of any further agitation to a temperature equal to or greater than the effective nucleation temperature of the aqueous reaction mixture and for sufficient time to result in the production of large zeolite crystals.

Zeolites that can be produced by the process of the present invention can be any of the naturally occurring or synthetic crystalline zeolites. Examples of these zeolites include large pore zeolites, intermediate pore size zeolites, and small pore zeolites. These zeolites and their isotypes are described in "Atlas of Zeolite Structure Types", eds. W. H. Meier, D. H. Olson and Ch. Baerlocher, Elsevier, Fourth Edition, 1996, which is hereby incorporated by reference. A large pore zeolite generally has a pore size of at least about 7 Å and includes LTL, VFI, MAZ, MEI, FAU, EMT, OFF, *BEA, and MOR structure type zeolites (IUPAC Commission of Zeolite Nomenclature). Examples of large pore zeolites, which correspond to a structure type listed above, include mazzite, offretite, zeolite L, VPI-5, zeolite Y, zeolite X, omega, Beta, ZSM-3, ZSM-4, ZSM-18, ZSM-20, SAPO-37 and MCM-22. A intermediate pore size zeolite generally has a pore size from about 5 Å to about 7 Å and includes, for example, MFI, MEL, MTW, EUO, MTT, MFS, AEL, AFO, HEU, FER, and TON structure type zeolites (IUPAC Commission of Zeolite Nomenclature). Examples of intermediate pore size zeolites, which correspond to a structure type listed above, include ZSM-5, ZSM-12, ZSM-22, ZSM-23, ZSM-34, ZSM-35, ZSM-38, ZSM-48, ZSM-50, ZSM-57, silicalite, and silicalite 2. A small pore size zeolite has a pore size from about 3 Å to about 5.0 Å and includes, for example, CHA, ERI, KFI, LEV, and LTA structure type zeolites (IUPAC Commission of Zeolite Nomenclature). Examples of small pore zeolites include ZK-4, SAPO-34, SAPO-35, ZK-14, SAPO-42, ZK-21, ZK-22, ZK-5, ZK-20, zeolite A, erionite, chabazite, zeolite T, gemlinite, ALPO-17, and clinoptilolite.

In general, the chemical formula of anhydrous crystalline metallosilicate zeolites expressed in terms of moles may be represented by the formula: $M_{2/n}O:W_2O_3:ZSiO_2$, wherein M is selected from the group consisting of hydrogen, hydrogen precursors, monovalent, divalent and trivalent cations and mixtures thereof; n is the valence of the cation and Z is a number of at least 2, preferably at least 3, said value being dependent upon the particular type of zeolite, and W is a metal in the anionic framework structure of the zeolite such as aluminum, gallium, boron, iron, or titanium. Preferably, the zeolite is a crystalline aluminosilicate zeolite or a crystalline gallium silicate zeolite.

The zeolite crystals such as crystals having an MFI structure type produced by the process of the present invention will preferably have a mass mean diameter of from about 3 to about 10 microns and, more preferably, will have a mass mean diameter of from about 3 to about 6 microns. Most preferably, a representative sample of the crystals will have no more than about 5% on a mass basis of zeolite crystals less than 1 micron diameter.

Procedures to determine zeolite crystal size are known to persons skilled in the art. For instance, crystal size may be determined directly by taking a suitable scanning electron microscope (SEM) picture of a representative sample of the zeolite crystals.

The sources of the various elements of the zeolite may be any of those in commercial use or described in the literature, as may the preparation of the synthesis mixture.

For example, the source of silicon may be a silicate, e.g., an alkali metal silicate, a tetraalkyl orthosilicate, a precipitated silica, or preferably an aqueous colloidal suspension of silica, for example one sold by E.I. du Pont de Nemours under the trade name Ludox.

When the zeolite is an aluminosilicate zeolite, the source of aluminum is preferably hydrated alumina dissolved in an alkaline solution. Other aluminum sources include, for example, aluminum metal, a water-soluble aluminum salt, e.g., aluminum sulphate, or an alkoxide, e.g., aluminum isopropoxide.

Optionally a directing agent, such as an organic or inorganic compound containing nitrogen, oxygen, sulfur, or phosphorous may be introduced into the synthesis mixture in either powder form or as an aqueous solution which is preferred. The cation may also be introduced in the form of a mixture of hydroxide and salt, e.g., a halide. The agent used will depend on the zeolite prepared by the process.

The order of mixing of the ingredients is not essential and will depend largely on the zeolite being prepared. For instance, the synthesis mixture can be prepared by dissolving the aluminum source in an aqueous caustic solution and then adding this to a mixture of a silica source in water.

Equipment used to prepare the zeolite crystals of the present invention are known to persons skilled in the art. For example, zeolites can be commercially prepared by using large autoclaves which have sufficient agitation to homogenize the zeolite reaction mixture during heat up until the effective nucleation temperature of the mixture is achieved. In general, stirring can be continued to any temperature below the effective nucleation temperature with little or no impact on product zeolite crystal size. However, if stirring is continued above the effective nucleation temperature, the product zeolite crystal size will decrease. Stirring to progressively higher temperatures above the effective nucleation temperature, or prolonged stirring at a temperature above the effective nucleation temperature, will lead to progressively larger decreases in size of product zeolite crystal. The effective nucleation temperature of the synthesis mixture will depend on the composition of the synthesis mixture which in turn will be governed by the zeolite being prepared. With respect to the preparation of an MFI type zeolite (e.g., ZSM-5), the synthesis mixture is preferably heated with agitation provided by a mixing device which will move the mixture in a turbulent fashion such as occurs with a pitch blade turbine mixer. Other means of introducing agitation known to one skilled in the art can be employed, such as pumping the synthesis mixture from one part of the autoclave to another. The purpose of the agitation is to assist heat transfer to the synthesis mixture in a uniform manner, but the degree of agitation should be low enough to minimize shear-induced seed formation in the synthesis mixture. When a turbine mixer is employed, the degree of agitation can be measured as the speed at which the blade tip moves through the synthesis mixture (tip speed). Preferably the tip speed should be less than about 5 meters per second (M/s) and more preferably less than about 3.5 M/s. The tip speed of the mixer can also be varied depending on the temperature distribution of the synthesis mixture and changes in mixture viscosity during heat up. Preferably a constant tip speed of about 1–2.0 M/s is used until a temperature from about 100 to about 120° C. is reached, and then the tip speed is increased gradually as heat up continues until the nucleation temperature is reached. Most preferably the maximum tip speed is about 2–5 M/s at a temperature of about 130 to about 150° C. and most preferably from about 2 to about 3.5 M/s at a temperature from about 140 to about 150° C. The time required for heat up of the reaction mixture should be as fast as practical to minimize the amount of time the synthesis mixture is agitated to reduce shear induced seeding. The time during which stirring occurs at temperatures above 130° C. is preferably less than about 6 hours and more preferably less than 3 hours. After the synthesis mixture reaches the effective nucleation temperature, the agitation is stopped. Heating of the reaction mixture can be allowed to occur after the stop of agitation with no undue effect to product quality. The temperature can also be maintained at the temperature reached when agitation was stopped. The synthesis mixture can also be allowed to cool after the agitation is stopped, but for MFI structure type zeolites, preferably the temperature is maintained between about 130° C. and about 150° C. The effective nucleation temperature can be confirmed by procedures known in the art such as by x-ray detection of crystal presence greater than any seed level. Changes in synthesis mixture viscosity during heat up can also be used to determined the onset of crystallization. The effective nucleation temperature will be a function of the type of zeolite being prepared and may often be expressed as a temperature range rather than a single sharply defined temperature, but will generally be between about 120° C. and about 150° C. for MFI type zeolites. For ZSM-5, the effective nucleation temperature will usually be in the range of from about 130 to about 150° C. The time required for the crystallization under static conditions will vary, but is preferably between about 4 and about 48 hours. More preferably the crystallization time is between about 12 and about 36 hours. The crystallization time can be established by methods known in the art such as by sampling the reaction mixture at various times and determining the yield and x-ray crystallinity of precipitated solid. The control of product crystallite size can be facilitated if the reaction mixture additionally comprises from about 0.05 ppm to about 10.0 percent seeds of zeolite based on the weight the synthesis mixture. The use of seeds to control zeolite crystallite size is disclosed in U.S. Pat. No. 5,672,331, which is hereby incorporated by reference. Seeds can be added to control the mass mean crystallite diameter. Even though the seed level can give crystal diameters within certain particular ranges, large crystals may not be achievable by reducing seeding level without employing the present invention. Stirring can affect the amount of seeds that are used when done above the effective nucleation temperature and preferably the seed level is from about 0.05 ppm to about 0.1 wt. % and more preferably from about 0.0001 to about 0.05 wt. %.

When the zeolite prepared by the process of the invention is an intermediate pore size zeolite, the intermediate pore size zeolite will generally comprise a composition having the following molar relationship:

$$X_2O_3:(n)YO_2,$$

wherein X is a trivalent element, such as aluminum, gallium, zinc, iron, and/or boron, Y is a tetravalent element such as silicon, tin, and/or germanium; and n has a value greater than 10, usually from about 20 to less than 20,000, more usually from 50 to 2,000, said value being dependent upon the particular type of zeolite and the trivalent element present in the zeolite. When the intermediate pore size zeolite is an aluminosilicate zeolite, the silica to alumina mole ratio will typically be from 10:1 to 1,000:1. If the aluminosilicate zeolite is used for acid catalyzed reactions, the silica to alumina mole ratio will usually be from about 20 to 200. When the intermediate pore size zeolite is a gallium silicate zeolite, the gallia to silica mole ratio will typically be from about 20 to 200.

The process of the present invention has particular application in the preparation of MFI type zeolites such as ZSM-5. ZSM-5 is disclosed in U.S. Pat. No. 3,702,886, which is hereby incorporated by reference.

When a MFI type aluminosilicate zeolite is prepared by the process of the present invention, the reaction mixture preferably has a composition, expressed in terms of mole ratios of oxides, as follows:

| Reactant | Preferred | More Preferred |
|---|---|---|
| $SiO_2Al_2O_3$ | >50 | 70 to 20,000 |
| $H_2O/SiO_2$ | 10 to 100 | 15 to 50 |
| $OH^-/SiO_2$ | 0.01 to 0.5 | 0.01 to 0.2 |
| [(1)]$R/SiO_2$ | 0.001 to 2.0 | 0.05 to 1.0 |

[(1)]R is directing agent selected from a group consisting of nitrogen, sulfur, oxygen, and phosphorous containing inorganic and organic compounds.

Upon completion of crystallization of the zeolite, the product crystals are separated from the reaction mixture by, for example, cooling and filtering, and water washed and dried at a temperature of typically from about 25° to about 250° C., and more preferably from 80° C. to about 120° C.

The crystals prepared by the instant invention can be formed into a wide variety of forms. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded or the crystals can be calcined to remove organic template and then extruded.

In the case of many catalysts, it is desirable that crystalline zeolites prepared by the process of the present invention be incorporated with binder material resistant to the temperature and other conditions employed in organic conversion processes. Such binder materials include synthetic or naturally occurring substances as well as inorganic materials such as clay, silica, and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid, treatment or chemical modification.

In addition to the foregoing materials, the zeolites as prepared herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The zeolite may also be composited with zeolitic material such as the zeolitic materials which are disclosed in PCT Publication 96/16004, which is hereby incorporated by reference.

The relative proportions of zeolite component and binder material will vary widely with the zeolite content ranging from between about 1 to about 99 percent by weight, more preferably in the range of about 10 to about 70 percent by weight of zeolite component, and still more preferably from about 20 to about 50 percent.

The zeolites prepared by the process of the present invention may be further ion exchanged after calcination to remove organic template as is known in the art either to replace at least in part the original alkali metal present in the zeolite with a different cation, e.g. a Group IB to VIII Periodic Table metal such as nickel, copper, zinc, palladium, platinum, calcium or rare earth metal, or to provide a more acidic form of the zeolite by exchange of alkali metal with intermediate ammonium, followed by calcination of the ammonium form to provide the acidic hydrogen form. The acidic form may be readily prepared by ion exchange using a suitable acidic reagent such as ammonium nitrate. The zeolite may then be calcined at a temperature of 400–550° C. to remove ammonia and create the hydrogen form. Particularly preferred cations will depend on the use of the zeolite and include hydrogen, rare earth metals, and metals of Groups IIA, IIIA, IVA, IB, IIB, IIIB, IVB, and VIII of the Periodic Table of the Elements.

The following examples exemplify the process of the present invention.

EXAMPLE 1

A sodium aluminate solution was prepared by dissolving alumina hydrate (201 parts by weight, 65% $Al_2O_3$ content) in a caustic solution comprising NaOH (369.1 parts by weight) and water (825 parts by weight) at 100° C. The solution was cooled and then added with vigorous stirring to a slurry containing colloidal silica (15400 parts by weight), tetrapropylammonium bromide (TPABr) (2457 parts by weight), water (16747 parts by weight), and 54 by weight MFI seeds to provide a synthesis mix. The mix was stirred until a homogeneous consistency was obtained. The molar composition of the mix, excluding seeds, was 80 $SiO_2$/1 $Al_2O_3$/3.6 $Na_2O$/7.2 TPABr/1168 $H_2O$. The mix (10 L) was placed in an autoclave and heated while stirring with a single blade turbine (0.8 M/sec tip speed). In 6 hours a temperature of 150° C. was reached at autogenous pressure. The heat up time between 140° C. and 150° C. was 20 min. The stirring was stopped and the mixture was allowed to crystallize without further agitation at 150° C. for 20 hours. After crystallization, a sample was taken. X-ray diffraction analysis showed the product was fully crystalline. Laser light scattering was used to determine the crystal size of the resulting crystals. The mass mean crystal diameter of the crystals and the amount of crystals less than 1 micron diameter is shown below in Table I.

EXAMPLE 2

A synthesis mix was prepared as described in Example 1. The mix (36 L) was placed in an autoclave and heated while stirring with a single blade turbine (0.8 M/sec tip speed). In 5 hours, a temperature of 130° C. was reached at autogenous pressure. The stirring was stopped and heating was continued in a static mode for 7 hours until a temperature of 150° C. was reached. The mixture was allowed to crystallize without further agitation at 150° C. for 20 hours. After crystallization, a sample was taken. X-ray diffraction analysis showed the product was fully crystalline. Laser light scattering was used to determine the crystal size of the resulting crystals. The mass mean crystal diameter of the crystals and the amount of crystals less than 1 micron diameter is shown below in Table I.

EXAMPLE 3

A synthesis mix was prepared as described in Example 1 except that the amount of seeds in the mix was 36 parts by weight. The mix (36 L) was placed in an autoclave and heated while stirring with a single blade turbine (0.8 M/sec tip speed). In 13.75 hours, a temperature of 140° C. was reached at autogenous pressure. The stirring was stopped and the mixture was allowed to crystallize without further agitation at 140° C. to 150° C. for 4.5 hours and then 20 hours at 150° C. for 24 hours. After crystallization, a sample was taken. X-ray diffraction analysis showed the product was fully crystalline. Laser light scattering was used to determine the crystal size of the resulting crystals. The mass mean crystal diameter of the crystals and the amount of crystals less than 1 micron diameter is shown below in Table I.

EXAMPLE 4

A synthesis mix was prepared as described in Example 1. The mix was placed in an autoclave and heated while stirring with a single blade turbine (0.8 M/second tip speed). In 6 hours a temperature of 150° C. was reached at autogenous pressure and stirring was continued at 150° C. for 48 hours during crystallization. After crystallization, a sample was taken. X-ray diffraction analysis showed the product was fully crystalline. Laser light scattering was used to determine the crystal size of the resulting crystals. The mass mean crystal diameter of the crystals and the amount of crystals less than 1 micron diameter is shown below in Table I.

TABLE I

| Example No. | Mass Mean Crystal Diameter (microns) | Percent of Crystals Less Than 1 Micron Diameter |
| --- | --- | --- |
| 1 | 3.67 | 4.5 |
| 2 | 4.21 | 4.2 |
| 3 | 3.83 | 4.2 |
| 4 | 2.76 | 7.2 |

The zeolite crystals of Examples 1, 2, and 3, which were prepared by the process of the present invention, had a mass mean diameter greater than 3 microns and less than 5% of the resulting crystals were less than 1 micron. The zeolite crystals of Example 4, which were prepared by agitating the synthesis mixture throughout the crystal preparation had a significantly smaller mass mean diameter and over 7% of the crystals were less than 1 micron.

What is claimed is:

1. A process for preparing large crystal zeolite comprising:
    (a) heating an aqueous synthesis mixture comprising sources of trivalent metal oxide, silica, alkali metal cations, optionally from 0 to about 10 weight percent of seeds of zeolite, and optionally a directing agent under agitation to a temperature equal to or less than the effective nucleation temperature of said aqueous reaction mixture; and,
    (b) heating said aqueous synthesis mixture in the absence of agitation at a temperature equal to or greater than the effective nucleation temperature of said aqueous reaction mixture.

2. The process recited in claim 1 wherein said zeolite is a large pore zeolite or an intermediate pore size zeolite.

3. The process recited in claim 2 wherein said trivalent metal is alumina, gallium, boron, or iron.

4. The process recited in claim 3 wherein said zeolite has a structure type selected from the group consisting of LTL, MAZ, MEI, EMT, OFF, *BEA, MOR, MEL, MTW, MTT, MFI, FER, and TON.

5. The process recited in claim 4 wherein said zeolite is an aluminosilicate zeolite or a gallium silicate zeolite.

6. The process recited in claim 5 wherein said zeolite is an intermediate pore size zeolite.

7. The process recited in claim 6 wherein said zeolite is a MFI or MEL structure type.

8. The process recited in claim 7 wherein said zeolite crystals have a mass mean diameter in the range of from about 3 to about 10 microns.

9. The process recited in claim 8 wherein the temperature of step (a) results in a reduction of the mass mean crystal diameter of the zeolite crystals of less than 10%.

10. The process recited in claim 9 wherein said zeolite is a MFI structure type.

11. The process recited in claim 10 wherein said MFI structure type zeolite is an aluminosilicate zeolite having a silica to alumina mole ratio of from about 20 to about 200.

12. The process recited in claim 11 wherein said temperature of step (a) is no greater than 150° C.

13. The process recited in claim 12 wherein said temperature of step (b) is no greater than 150° C.

14. The process recited in claim 7 wherein said aqueous reaction mixture has the following composition in terms of mole ratios of oxides:

| | |
|---|---|
| $SiO_2:Al_2O_3$ | >50 |
| $H_2O:SiO_2$ | 10 to 100 |
| $OH^-:SiO_2$ | 0.01 to 0.5 |
| $R:SiO_2$ | 0.001 to 2.0 | wherein R is a directing agent selected from a group consisting of nitrogen, sulfur, oxygen, and phosphorous containing inorganic and organic compounds.

15. The process recited in claim 14 wherein said large size zeolite crystals have a mass mean diameter in the range of from about 3 to about 6 microns.

16. A process of preparing MFI or MEL structure-type large zeolite crystals comprising the steps of:
    (a) forming an aqueous reaction mixture comprising sources of trivalent metal oxide, silica, alkali metal cations, optionally from 0 to about 10 weight percent seed crystals; and, optionally a directing agent;
    (b) heating the aqueous reaction mixture under agitation to a temperature no greater than the effective nucleation temperature of said aqueous reaction mixture; and,
    (c) heating the aqueous reaction mixture of step (b) in the absence of agitation to a temperature equal to or greater than the effective nucleation temperature of said aqueous reaction mixture and for sufficient time to result in the production of large zeolite crystals.

17. The process recited in claim 16 wherein said aqueous reaction mixture of step (a) contains from about 0.05 ppm to about 0.1 percent by weight of seeds of zeolite.

18. The process recited in claim 16 wherein said temperature of step (b) is in the range of from about 130° C. to 150° C.

19. The process recited in claim 18 wherein said trivalent metal oxide is alumina, gallia, boron oxide, iron oxide, or mixtures thereof.

20. The process recited in claim 19 wherein said zeolite is a MFI structure type.

21. The process recited in claim 20 wherein said zeolite is an aluminosilicate zeolite having a silica to alumina mole ratio from about 10 to about 1,000.

22. The process recited in claim 21 wherein said temperature of step (c) is in the range of from about 130° C. to 150° C.

23. The process recited in claim 22 wherein said crystals have a mean mass diameter of from about 3 to about 6 microns.

24. The process recited in claim 23 wherein said aqueous reaction mixture of step (c) is heated for up to 48 hours.

25. The process recited in claim 21 wherein said aqueous reaction mixture has the following composition in terms of mole ratios of oxides:

| | |
|---|---|
| $SiO_2:Al_2O_3$ | >50 |
| $H_2O:SiO_2$ | 10 to 100 |
| $OH^-:SiO_2$ | 0.01 to 0.5 |
| $R:SiO_2$ | 0.001 to 2.0 | wherein R is a directing agent selected from a group consisting of nitrogen, sulfur, oxygen, and phosphorous containing inorganic and organic compounds.

26. The process recited in claim 25 wherein the temperature of step (b) results in a reduction of the mass mean crystal diameter of the zeolite crystals of less than about 10%.

* * * * *